US006609303B2

United States Patent
Rogel

(10) Patent No.: US 6,609,303 B2
(45) Date of Patent: Aug. 26, 2003

(54) PISTACHIO NUT OPENER FOR SPLITTING OPEN PISTACHIO NUT SHELLS

(76) Inventor: Henry Rogel, 30705 Cannon Rd., Solon, OH (US) 44139

( * ) Notice: Subject to any disclaimer, the term of this patent is extended or adjusted under 35 U.S.C. 154(b) by 100 days.

(21) Appl. No.: 09/765,161

(22) Filed: Jan. 19, 2001

(65) Prior Publication Data

US 2001/0002513 A1 Jun. 7, 2001

Related U.S. Application Data

(63) Continuation-in-part of application No. 09/447,244, filed on Nov. 23, 1999.

(51) Int. Cl.[7] .............................................. A47J 43/26
(52) U.S. Cl. .......................................... 30/120.4; 81/302
(58) Field of Search ............................ 30/120.3, 120.4, 30/120.5, 113.2; 99/568, 574, 577, 578; 83/932; 81/302, 418, 419; 426/299

(56) References Cited

U.S. PATENT DOCUMENTS

| | | | | | |
|---|---|---|---|---|---|
| 326,909 A | * | 9/1885 | Kricker | .......................... | 81/302 |
| 478,009 A | * | 6/1892 | Hollis | .......................... | 81/302 |
| 549,690 A | * | 11/1895 | Morley | ...................... | 30/113.2 |
| 1,122,165 A | * | 12/1914 | Schoening | ................... | 81/302 |
| 1,178,684 A | * | 4/1916 | Shimoda | ..................... | 30/113.2 |
| 1,256,439 A | * | 2/1918 | Clark | .......................... | 30/113.2 |
| 1,324,557 A | * | 12/1919 | Landaw | ......................... | 81/302 |
| 1,351,216 A | * | 8/1920 | Pifer | .......................... | 30/113.2 |
| 1,539,156 A | * | 5/1925 | Burgess | ....................... | 30/113.2 |
| 1,622,309 A | * | 3/1927 | De Forest | ................... | 30/113.2 |
| 1,646,564 A | * | 10/1927 | Vaughan | ...................... | 30/113.2 |
| 1,994,473 A | * | 3/1935 | Jones | .......................... | 30/113.2 |
| 2,113,500 A | * | 4/1938 | Stathem | ...................... | 30/113.2 |
| 2,202,984 A | * | 6/1940 | Drypolcher | .................. | 254/28 |
| 2,222,744 A | * | 11/1940 | Gallien | ......................... | 81/302 |
| 2,472,354 A | * | 6/1949 | Walters | ...................... | 30/120.3 |
| 2,481,647 A | * | 9/1949 | Generes | ......................... | 254/28 |
| 2,483,383 A | * | 9/1949 | Heimann et al. | ............. | 81/302 |
| 2,513,505 A | * | 7/1950 | McKinnon | ................. | 30/113.2 |
| 2,570,881 A | * | 10/1951 | Stewart | ........................ | 81/302 |
| 2,643,565 A | * | 6/1953 | Mount | ......................... | 81/302 |
| 2,647,278 A | * | 8/1953 | Weinberger | .................. | 81/302 |
| 2,751,948 A | * | 6/1956 | Facchini | .................... | 30/113.2 |
| 2,757,666 A | * | 8/1956 | Grant | .......................... | 81/302 |
| 3,074,449 A | * | 1/1963 | Mikulas | ..................... | 30/120.2 |
| 3,540,106 A | * | 11/1970 | Goldman | ..................... | 81/302 |
| 3,817,078 A | * | 6/1974 | Reed et al. | .................... | 81/43 |

(List continued on next page.)

FOREIGN PATENT DOCUMENTS

DE         44 11 778 A1  * 10/1995

Primary Examiner—Allan N. Shoap
Assistant Examiner—Jason Prone
(74) Attorney, Agent, or Firm—Hudak, Shunk & Farine Co., LPA; Thomas M. Schmitz

(57) ABSTRACT

A hand held pistachio nut opener for splitting open pistachio nut shells and removing the edible nut from the opened half shells comprises forwardly directed upper and lower protruding members having forward distal edges adapted to be inserted in the lateral peripheral separation between the half shells of the pistachio nut to split open the half shells. The upper protrusion member is operative to open upwardly relative to the stationary lower protrusion member. The upper forward protrusion member is secured to a rearward extension member operatively rotatable about an interconnecting means secured to a rearward extension means of the stationary lower protrusion member. A spring bias means maintains the movable upper protrusion in closed engagement with the stationary lower protrusion, but is operative in response to compressive thumb pressure applied rearwardly to the upper rotatable extension member to rotate the upper protrusion member upwardly away from the lower stationary protrusion member and operative to separate and split open the half shells of the pistachio nut.

2 Claims, 1 Drawing Sheet

U.S. PATENT DOCUMENTS

| | | | | |
|---|---|---|---|---|
| 4,068,573 A | * | 1/1978 | Romero | 30/120.1 |
| D262,055 S | * | 11/1981 | Luikart | 81/302 |
| 4,395,823 A | * | 8/1983 | Thibault | 30/120.5 |
| 4,462,156 A | * | 7/1984 | Himelhoch | 30/113.2 |
| 4,539,873 A | * | 9/1985 | Freed | 81/311 |
| D284,216 S | * | 6/1986 | Dyson-Hughes | D24/135 |
| 4,619,046 A | * | 10/1986 | Goulter | 30/113.2 |
| 4,658,489 A | * | 4/1987 | Johnston | 29/268 |
| D298,408 S | * | 11/1988 | Johnston | D8/52 |
| 5,065,650 A | * | 11/1991 | Anderson et al. | 81/302 |
| 5,174,177 A | * | 12/1992 | Jeromson et al. | 81/302 |
| 5,217,464 A | * | 6/1993 | McDonald | 81/419 |
| 5,339,524 A | * | 8/1994 | Sawyer, III et al. | 30/113.2 |
| 5,709,660 A | * | 1/1998 | Doyle et al. | 604/116 |
| 6,035,508 A | * | 3/2000 | Smith | 81/302 |
| 6,145,417 A | * | 11/2000 | Bates et al. | 81/302 |
| 6,257,105 B1 | * | 7/2001 | Lin | 81/302 |
| 6,378,213 B1 | * | 4/2002 | Griffith | 30/120.2 |
| 6,470,774 B2 | * | 10/2002 | Chang | 81/302 |
| 2002/0104219 A1 | * | 8/2002 | Olson | 30/120.1 |

\* cited by examiner

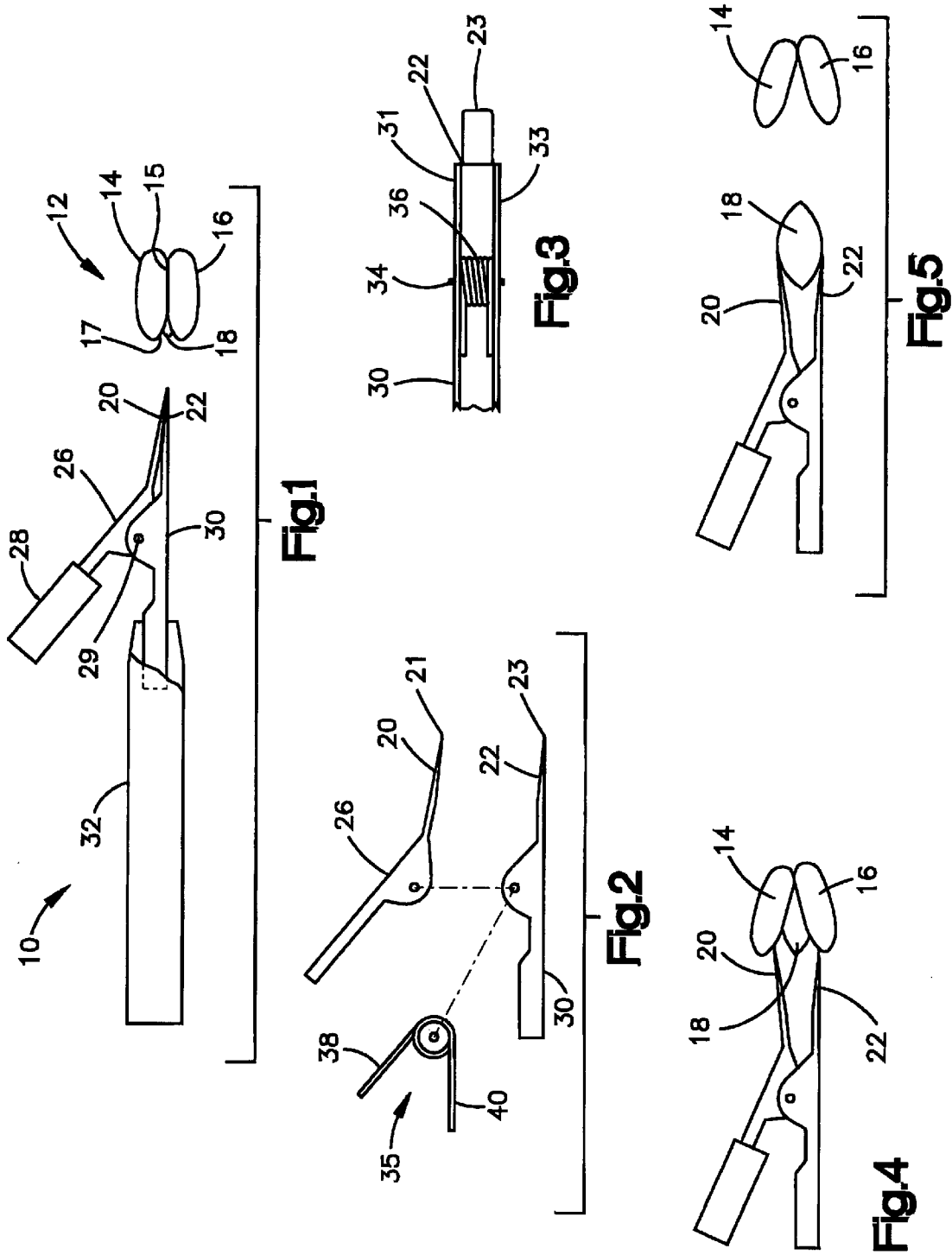

PISTACHIO NUT OPENER FOR SPLITTING OPEN PISTACHIO NUT SHELLS

This is a continuation in part of copending application Ser. No. 09/447,244 filed Nov. 23, 1999.

This invention pertains to a household hand held food implement for splitting open and shelling half shells of edible nuts, and more particularly to a pistachio nut opener for separating pistachio nut half shells and removing the edible pistachio nut from the shells.

BACKGROUND OF THE INVENTION

Pistachio nuts are nature grown small edible nuts contained in a closed shell comprising attached top and bottom half shells adapted to be split laterally open but quite secure with an edible nut inside and intact as the natural pistachio nut. Pistachio nuts ordinarily are either white or red in color, quite small in size, and frequently are served as snack foods available at parties. However, the nuts are purchased with the shells intact to maintain freshness of the edible nut inside, which requires the user to remove the shells from the edible nut before eating. The user most often is a party attendee who separates and removes the shells by hand from individual nuts. The shell removal is somewhat tedious since the two half shells are not easily broken by squeezing or compressive pressure, but instead need to be separated manually along the lateral peripheral separation between the half shells, and then pulled apart. In the roasting process of pistachio nuts, a small separation apparently results between the upper and lower half shells, frequently at one end of the roasted pistachio nut, which provides a small opening to physically grasp to separate, open, and remove the half shells from the internally enclosed nut. Pistachio nuts are small nuts, requiring nimble fingers, along with sufficient coordination to remove the edible nut from the shell. The small pistachio nuts frequently are hand held and the shells manually separated by inserting one's finger nails in the peripheral separation between the upper and half shells to physically open and separate the half shells. The pistachio nut half shells are thin and somewhat rigid but sufficiently resilient to be easily separated along the lateral separation of the half shells without cracking the nut inside the half shells.

Hand held pistachio nut openers for separating the pistachio nut half shells are known, for example, in U.S. Pat. Nos. 4,317,281 and 4,462,156 and 5,339,524. A pocket size nut opener is disclosed in U.S. Pat. No. 4,317,281 for separating the half shells of a pistachio nuts described as obloid in shape and having a pair of half shells defining a narrow slit between the half shells enclosing the edible nut, where the pistachio nuts are opened by a curved spoon hook implement. In U.S. Pat. No. 4,462,156, a pistachio nut opener is adapted to be inserted into the lateral separation between the half shells for forcing open the half shells and removing the edible nut contained within the shells. Similarly, U.S. Pat. No. 5,339,524 discloses a pistachio nut opener for shelling edible nuts, such as pistachio nuts, by inserting end members of a food implement between the half shells and separating the half shells.

It now has been found that a small hand held nut shelling implement comprising a pistachio nut opener can effectively and efficiently separate the half shells of a pistachio nut and expediently enable removal of the edible nut from within the separated half shells. In accordance with this invention, the pistachio nut opener of this invention contains forwardly extending protrusion members with engaging distal forward edges adapted to engage the outer peripheral lateral separation between the closed half shells of a pistachio nut, where the forward protrusions are operative to separate and split open and separate the half shells. The forward extending protrusions comprise an upper protrusion member and a lower protrusion member, where each has a rearward extension member operatively interconnected to enable vertical separation of the forwardly disposed distal edges of the protrusion members. The top protrusion member moves upwardly relative to the lower stationary protrusion member, thereby operative to split open the closed half shells of the pistachio nut. The upper and lower forward protrusion members are spring biased to maintain the protrusion forward distal edges closed, which requires compressive pressure to rotate the upper protrusion upwardly relative to the stationary lower protrusion to split open the closed pistachio nut half shells. After the half shells are split open, the edible nut inside the shells can be expediently removed. The pistachio nut opener of this invention provides a small, simple to operate, hand held food implement adapted to remove edible nuts from the shells of a pistachio nut without cracking the shells or damaging the edible nut within the shells. These and other advantages of the invention will become more apparent by referring to the illustrative drawings and the detailed description of the invention.

SUMMARY OF THE INVENTION

Briefly, the invention consists of a hand held pistachio nut opener for separating half shells of an edible pistachio nut to enable removal of the edible pistachio nut contained within the half shells. The pistachio nut opener has a pair of cooperating, forwardly disposed, protrusion members for engaging the half shells, comprising upper and lower forward protrusion members having forward distal ends adapted to engage the peripheral lateral separation between the half shells to expand apart and separate the half shells. The forward disposed protrusion members both have rearward extensions operatively interconnected and spring biased to maintain the forward protrusion members together in a flat closed position, but operative to vertically separate the forward protrusion members. The upper protrusion member rotates upwardly, while the lower forward protrusion member remains stationary. The separating rotation of the forward protrusion members is activated by applying downward compressive pressure against a rearward extension disposed rearwardly of the spring loaded biased operative interconnection. While both the distal ends of the forward protrusion members are inserted between the half shells to engage the shells at the peripheral lateral separation of the half shells, the rotating upward movement of the upper protrusion member relative to the stationary lower protrusion member causes the closed half shells of the pistachio nut to separate and expose the edible pistachio nut inside the shells, whereby the edible nut can be easily removed from the shells.

IN THE DRAWINGS

FIG. 1 is a side elevation view of the hand held pistachio nut opener of this invention;

FIG. 2 is an exploded side assembly view of the operative parts of the pistachio nut opener shown in FIG. 1;

FIG. 3 is a partial inside plan view of the lower part of the operative parts in FIG. 2 showing a spring biased means assembled with the lower part;

FIG. 4 is a side elevation of the operative parts of the pistachio nut opener in FIG. 1 engaging and separating the pistachio nut half shells; and FIG. 5 is a side elevation view similar to FIG. 4 showing the pistachio nut opener grasping and removing the edible pistachio from the separated nut half shells.

DETAILED DESCRIPTION OF THE INVENTION

Referring now to the drawings wherein like reference numbers indicate like parts, shown is a hand held pistachio nut opener 10 of this invention for splitting open a pistachio nut 12 disposed laterally adjacent to the nut opener 10 in FIG. 1. A pistachio nut 12 comprises in its natural state a closed shell consisting of an upper half shell 14 and a lower half shell 16 separated by a lateral peripheral separation 15 disposed between the upper shell 14 and lower shell 16 attached together and containing an edible pistachio nut 18 disposed within the closed shells 14, 16. Apparently in the roasting process of pistachio nuts 12, a small separation ordinarily occurs along the lateral peripheral separation 15 between the half shells 14, 16, and typically at one end of the pistachio nut 12, as shown in FIG. 1 as a small separation 17 facing the pistachio nut opener 10. The small opening or separation 17 in the peripheral lateral separation 15 exposes a small end portion of the nut 18 within the half shells 14, 16.

In accordance with this invention, the pistachio shell opener 10 comprises a movable upper forwardly disposed flat protruding member 20 in a closed juxtaposed flat position with a complimentary stationary lower flat protruding member 22, where the protrusion members 20, 22 contain distal leading edges 21, 23 adapted to be inserted between peripheral edges of the closed nut half shells 14 and 16, and particularly into the small separation 17 disposed between the half shells 14, 16 at one end of the pistachio nut 12. The forwardly extending protrusion members 20, 22 are operative to engage, open and expand apart the half shells 14, 16 to remove the internal nut 18 from within the shells 14, 16. The forward configurations of the forwardly disposed protrusion distal edges 21, 23 can be angular, rounded, or preferably square leading edges, for convenient insertion into the opening 17 in the peripheral separation 15 between the nut shells 14, 16. As best shown in FIG. 2, the lower surface of the movable upper protrusion member 20 is flat, while the upper surface of the lower stationary protrusion member 22 is likewise flat, to provide intimate flat juxtaposition of the respective surfaces. In preferred aspects of the invention, the upper surface of upper protrusion member 20 comprises a declining upper surface terminating in a narrowed forward sharp distal end point 21, as shown in FIG. 2. Similarly, the lower surface of the lower protrusion 22 comprises an upwardly inclining lower surface terminating in a narrowed forward sharp distal end point 23. The sharp distal end points 21, 23, provide narrowed, converging, upper and lower distal edges 21, 13 for easy insertion into the small separation 17 between the half shells 14, 16 of the pistachio nut 12.

The upper protrusion member 20 is secured to an upwardly angular rearward extension member 26 extending upwardly into an attached thumb depressing member 28 adapted in use to be compressed and depressed downwardly. The upper protrusion member 20 is movable upwardly relative to the lower stationary protrusion member 22 by pivotal rotational movement around rotational point 29 to rotate the thumb depressing member 28 downwardly and thus raise the forwardly extending upper protrusion member 20 upwardly. The lower forwardly extending protrusion 22 remains stationary and extends rearwardly into a stationary straight extension member 30 extending rearwardly into a securely attached handle 32. The upper angular extension 26 is rotationally operatively connected to the stationary lower extension member 30 by a rotational interconnecting means adapted to provide rotational movement about the rotational interconnecting point 29, such as a transverse cross member interconnecting rod 34 secured to the stationary lower extension 30 at rotational point 29, as indicated in FIGS. 2 and 3. The movable upper extension 26 is operatively connected to the rod 34 to enable rotation about the fixed rod 34 secured to stationary lower extension member 30.

In preferred constructions, the upper and lower extensions 26, 30 each comprise laterally spaced vertical wall members maintained laterally spaced apart to accommodate a spring bias means 35 disposed between the laterally side spaced walls. As best viewed in FIG. 3, laterally spaced side walls 31, 33 are shown in a bottom view of the lower extension member 30 having the spring means 35 disposed between the side walls 31, 33 and comprising a coiled wire spring 36 wound around interconnecting rod 34 secured between the side walls 31, 33 of the lower stationary member 30. The spring bias means 35 comprises rigid spring steel wire wound around the interconnecting rod 34 to provide bias spring loading engagement with the rotatable upper movable extension member 26 relative to the lower stationary extension member 30. The upper movable extension 26 rotates or pivots around the interconnecting rod 34 secured between laterally spaced side walls 31, 33 of the lower extension member 26. The upper forward protrusion member 20 is maintained in closed engagement with lower forward protrusion member 22 by the biased spring means 35 impinging upon the upper rearward extension 26 keeping the forward disposed protrusion members 20, 22 closed. The biased spring means 35 comprises a coiled spring steel wire 36 with a rigid upper terminal wire end 38 directed rearwardly in biased compressive engagement against the inside surface of the upwardly angular extension member 26. Similarly, a rigid lower terminal end 40 of the coiled spring 36 is disposed rearwardly in bias compressive engagement against the inside surface of the stationary lower extension 30. The biased spring means 35 maintains the forwardly disposed protrusion members 20, 22 in a closed position before use, but permits the forward protrusion members 20, 22 to separate by the user imposing resilient compressive downward movement of the thumb depressor 28 against the biased spring means 35, which enables rotational upward movement about the intervening rod 34 to actuate pivotal vertical movement of the upper protrusion member 20 relative to the stationary lower protrusion member 22, as best viewed in FIG. 4. The transverse intervening rod 34 disposed between the rearwardly angular disposed thumb depressor 28 and the forwardly disposed upper protrusion member 20 provides a leverage pivot point 29 for rotational movement of the upper protrusion member 20.

In use, the hand held the pistachio nut opener 10 can be grasped by the handle 32 in one hand and aligned with a pistachio nut 12 held in the other hand as shown in FIG. 1. The forward disposed leading sharp edges 21, 23 of the protrusion members 20, 22 can be inserted into the slightly open end 17 at the outer peripheral separation of the half shells 14, 16 to engage and separate the shells 14, 16 at the lateral peripheral separation 15 of the pistachio nut 12. The preferred narrowed leading edges 21, 23 engage the outer periphery of the closed half shells 14, 16, as viewed in FIG. 4. The leading edges 21, 23 of the forward protrusions 20, 22 do not enter the pistachio nor engage the edible nut inside the half shells 14, 16, but merely engage the outer periphery of the half shells 14, 16 at the lateral separation 15, and preferably at the small opening 17, without disturbing the edible nut inside the half shells 14, 16. Upon engaging the half shells 14, 16, the thumb depressor 28 can be compressed downwardly to cause rotational movement of the upper movable extension member 26 about the stationary rod 34 to actuate upward movement of the upper protrusion member 20, and thereby separate and split open the upper shell 14 from the lower shell 16 at the peripheral lateral separation of the shells 14, 16, as viewed in FIG. 4. After the half shells 14, 16 are completely separated, the forward protrusion members 20, 22 can be used, if desired, to grasp and remove the edible nut 18 from the split apart shells 14, 16, as shown in FIG. 5.

Although preferred embodiments of the pistachio nut opener of this invention are described herein and illustrated by the drawings, the scope of the invention is not intended to be limiting, except by the appended claims.

What is claimed is:

1. A hand held pistachio nut opener for removing half shells from an edible pistachio nut inside the shells, the half shells separated by an outer peripheral lateral separation and a small opening at the peripheral separation between the half shells, the pistachio nut opener adapted to engage the small opening between the half shells to separate the half shells and expose the edible pistachio nut, the pistachio nut opener comprising a pair of cooperating forwardly extending flat protrusion members, each flat protrusion member having a forwardly disposed edge adapted to engage the small opening separation between the closed half shells of the pistachio nut, the flat protrusion members in a closed position consisting of a movable upper flat protrusion member and a stationary lower flat protrusion member, the stationary lower flat protrusion member secured to a rearwardly disposed stationary lower extension member, the lower extension member secured to a rearwardly disposed handle holding member;

the upper movable flat protrusion member secured to a rearwardly disposed movable upper extension member, the movable upper extension member being operatively interconnected to the lower stationary extension member by a laterally transverse interconnecting member operative to permit upward rotational movement of the movable upper flat protrusion member relative to the stationary lower flat protrusion member to enable vertical separation of the movable upper flat protrusion member relative to the stationary lower flat protrusion member;

each forwardly extending flat protrusion member having an inner surface facing each other and having an outer surface facing in the opposite direction of the inner surface on the same forwardly extending flat protrusion member, said inner surfaces being juxtaposed in surface to surface contact in the closed position of the nut opener throughout the entire surface areas of said inner surfaces, said inner surfaces being the same size and shape, said outer surface of the lower stationary flat protrusion member lies in the same plane as an outer surface of the stationary lower extension member;

the upper movable extension member orientated angularly rearwardly and upwardly and having a thumb depressing member operative to depress downwardly toward the stationary lower extension member, the thumb depressing member operative to rotate the movable upper flat protrusion member upwardly to separate the movable upper flat protrusion member from the stationary lower flat protrusion member;

a spring bias member engaging the laterally transverse interconnecting member and in bias engagement with the upper movable extension member and the lower stationary extension member, the spring bias member maintaining the flat protrusion members in the closed position to enable the forward distal edges of the upper and lower flat protrusion members to engage the small opening separation between the claosed half shells, the spring bias member being resilient to pressure applied to the thumb depressing member relative to the stationary lower flat protrusion member to separate the half shells and expose the edible pistachio nut for removal from the separated half shells.

2. The hand held pistachio nut opener of claim 1 where the stationary lower extension member comprises laterally spaced side walls and the laterally transverse interconnecting member is an interconnecting rod secured between the laterally spaced side walls.

* * * * *